(12) United States Patent
Matityaho (10) Patent No.: US 10,817,833 B2
(45) Date of Patent: Oct. 27, 2020

(54) SYSTEM AND METHOD FOR MANAGING INVENTORY BASED ON RFID TECHNOLOGY

(71) Applicant: Logitag Systems Ltd., Netanya (IL)

(72) Inventor: Shlomo Matityaho, Tel Mond (IL)

(73) Assignee: LogiTag Systems Ltd. (IL)

( * ) Notice: Subject to any disclaimer, the term of this patent is extended or adjusted under 35 U.S.C. 154(b) by 294 days.

(21) Appl. No.: 15/561,146

(22) PCT Filed: Mar. 24, 2016

(86) PCT No.: PCT/IL2016/050325
§ 371 (c)(1),
(2) Date: Sep. 25, 2017

(87) PCT Pub. No.: WO2016/151594
PCT Pub. Date: Sep. 29, 2016

(65) Prior Publication Data
US 2018/0053143 A1 Feb. 22, 2018

Related U.S. Application Data
(60) Provisional application No. 62/137,277, filed on Mar. 24, 2015.

(51) Int. Cl.
*G06Q 10/08* (2012.01)
*G06K 7/10* (2006.01)

(52) U.S. Cl.
CPC ....... *G06Q 10/087* (2013.01); *G06K 7/10316* (2013.01); *G06Q 10/08* (2013.01)

(58) Field of Classification Search
USPC ......................................................... 705/28
See application file for complete search history.

(56) References Cited

U.S. PATENT DOCUMENTS 7,737,858 B2    6/2010 Matityaho
2008/0231456 A1*  9/2008 Matityaho ............ H01Q 1/2216
                                                          340/572.7

(Continued)

OTHER PUBLICATIONS

International Search Report and Written Opinion dated Jul. 28, 2016 for corresponding International Application having PCT Application No. PCT/IL2016/050325.

*Primary Examiner* — Garcia Ade
(74) *Attorney, Agent, or Firm* — Emerson, Thomson & Bennett, LLC; Roger D. Emerson; Peter R. Detorre (57) ABSTRACT

Systems and methods for managing one or more inventories of RFID tagged articles for one or more compounds in which the tagged articles are stored in storage units therein. The system in each compound comprises a plurality of reader units each configured to be located inside or in proximity to a storage unit of the compound, wherein each reader unit comprises: at least one RF antenna for receiving signals data from the RFID tags of articles in the storage unit thereof; and a communication unit configured at least for transmitting the received data through at least one communication link; and a local management module adapted to receive data from the reader units. In certain embodiments, each local management module is configured for communicating with a central remote managing unit configured for managing inventories of a plurality of compounds.

11 Claims, 6 Drawing Sheets

(56) References Cited

U.S. PATENT DOCUMENTS

| | | | |
|---|---|---|---|
| 2009/0166415 A1* | 7/2009 | Braun | G06Q 10/087 235/385 |
| 2010/0090004 A1* | 4/2010 | Sands | G06Q 10/087 235/385 |
| 2013/0041784 A1* | 2/2013 | Danilewitz | G06K 19/0723 705/28 |

* cited by examiner

SYSTEM AND METHOD FOR MANAGING INVENTORY BASED ON RFID TECHNOLOGY

FIELD OF THE INVENTION

The present invention generally relates to systems and methods for managing inventory and particularly to systems and methods for managing inventory that are based on wireless technology such as radio frequency RF identification (RFID) technology.

BACKGROUND OF THE INVENTION

Managing inventory by using RFID technology is common in the retailing and wholesale industries. These systems typically requires specially designed storage units that have built-in RFID readers or alternatively require an authorized person to approximate the products to an RFID reader antenna for the reader to be able to identify the products inserted into or pulled out of the storage unit.

U.S. Pat. No. 7,737,858 teaches a system, method and kit for managing RFID-tagged articles. The kit allows transforming a cabinet to an RFID-enabled cabinet. The transformation can be performed in the field. The RFID-enabled cabinet is fitted with a controller, communication means, one or more RFID readers, one or more antennae for reading RFID tags, and a multiplexer connecting the RFID reader and the antennae. Each antenna comprises a switch for activating and deactivating the antenna and a tuning board. No more than one antenna is activated at a given time thus avoiding interference between the different antennas. A central database can communicate with the RFID-enabled cabinets thus managing an inventory of RFID-enabled articles across multiple cabinets in multiple geographies.

KR100801487 teaches a portable inventory device using an RFID of a UHF band to position a mast having an antenna at a side region of a cart, or a region of progressing direction selectively, thereby smoothly moving a cart on a narrow passageway without interference and recognizing goods in a larger area. The portable inventory device comprises a cart, a radio network device, and a mast having on antenna. A monitor and a keyboard are installed on the cart. The radio network device is for communication between a main computer and a database. The mast with at least one antenna recognizes goods for inventory placed on each shelf. The mask is positioned selectively at a progressing direction region of the cart, or both side regions) corresponding to each shelf. The portable inventory device using the RFID of an UHF band recognizes and inspects goods having an RFID tag for inventory.

SUMMARY OF THE INVENTION

Establishments such as hospitals use high value consumable, for example, in operating-rooms, pharmacies and other locations. The logistics challenges in managing these consumable items are significant. These items incur waste of resources and losses due to expired and misplaced items, thus creating the need for real-time visibility and control of consumable inventories. The inventory system of the invention can transform these types of cabinets, store rooms and shelving in which those consumable items are stored, making them RFID-Enabled, harnessing the power of RFID to automate inventory management processes.

The system of the invention is designed to enable an easy transformation and retrofitting of cabinets and shelving. By installing a kit (RFID tags on articles, an RFID reader on each cabinet) such cabinets become RFID controlled area, and periodic scans provide visibility of its inventory, enabling better control, right-sizing inventory levels, reducing waste on expired items and reducing waste on lost and misplaced items.

The present invention, according to some embodiments thereof, provides a system for managing an inventory of articles tagged by radio frequency identification (RFID) tags that are distributed in a plurality of storage units located in a predefined compound, wherein the system comprises: (a) a kit with a plurality of reader units each configured to be located inside or in proximity to a storage unit of the compound, wherein each of the reader units comprises: (i) at least one RF antenna for receiving signals data from the RFID tags of articles in the storage unit it is located in or in proximity to or an area of the storage unit; and (ii) a communication unit configured at least for transmitting the received data through at least one communication link; and (b) a local management module adapted to receive data from the reader units for managing inventory of the compound. The reader units are configured to be installed in or adjacent to their respective storage units for retrofitting existing storage units of the compound for adding on the RFID reading abilities to the existing storage units for inventory management thereof. The local management module is operable through a computer medium located in the compound remotely from the reader units.

In some embodiments, the local management module is configured for communicating with a central remote managing unit configured for managing inventories of a plurality of compounds that is remotely located from the compound.

Optionally, at least one of the reader units is configured to be able to receive signals transmitted by other reader units and transmitting information indicative thereof to the main managing unit through the respective reader communication link thereof, for acting also as a relay device for other reader units.

The communication link between the RFID tags of the articles and the reader units antennas may be based on RF ultra-high frequency (UHF) band within the range of 860-960 MHz.

The communication between at least some of the reader units and the local management module may be via at least one wireless communication link and/or cabled link.

In case of wireless communication the system may be configured to use one of the following wireless communication technologies: Bluetooth, UHF RF. WiFi or ZigBee.

According to some embodiments, each of the reader units if the system has a processor therein and a casing configured such as to be able to attach to or mounted over the storage unit.

At least some of the RF antennas of the reader units of the system may be configured such as to cover the nearby area of the storage unit interior. For example, the RF antennas or some of them may be external to the reader unit and connected thereto via connecting cabling or wirelessly communicating with the reader unit using a wireless communication link and some of the RF antennas may be embedded onboard to the reader units.

The RF antennas used in the reader units, whether embedded therein or communicable therewith may be any one or more of the following types: multi-directional or omnidirectional RF antennas optionally using phase array configuration for firming directionality towards the storage unit interior or having no phase difference therebetween; and/or circular antennas, using circular polarization.

The RFID tags of the articles may optionally be passive tags requiring operation be transmission of RF signaling and the RF antennas should then be configured for corresponding RF operation of the passive RFID tags including transmission means for transmitting signals via RFID link.

The communication between at least some of the reader units and the managing unit is optionally carried out through at least one of: WiFi, Bluetooth, ZigBee, RF UHF and/or through cable communication.

In some embodiments, each reader unit of the system is set to transmit data to the local management module according to a transmission frequency, which is predefined or adjustable i.e. at each predefined and optionally adjustable time interval.

The present invention in other embodiments thereof provides a method for managing an inventory of a compound comprising: (a) receiving updated signal data from RF antennas of multiple reader units each reader unit located in proximity or in a different storage unit of the compound, wherein the antennas signals are indicative of readings from RFID tagged articles in each of the storage units; (b) updating at least one inventories related database; and (c) managing inventory of the compound according to the updated inventory of the compound in the database.

According to some embodiments of the method, the method further comprises: (d) identifying evens including at least supply shortage or surplus and articles misplacement events; and (e) operating at least one operation responsive to the identification of an event. The operation may comprise, for example: (i) sending an alert message to at least one destination for indicating the event; and/or (ii) automatic ordering of articles identified as being in shortage in the compound.

The RF antennas and RFID tags optionally communicate through RFID ultra-high frequency (UHF) in the range of 860-960 MHz.

The present invention, according to other aspects thereof, provides a system for remote and central managing of multiple inventories located in multiple compounds in which the inventories of articles are stored, each compound having multiple storage units for keeping its articles therein, each article is attached with a radio frequency identification (RFID) tag. This system comprises: (a) a plurality of local inventory systems each comprising a local inventory managing module and multiple RFID reader units configured for reading RFID tags of multiple RFID tagged articles stored in a compound, each reader unit associated with a different storage unit of the compound; and (b) a central remote managing unit operable through at least one computer system, said central remote managing unit being configured for receiving inventory data from the local managing modules and managing the inventory in each compound by managing at least one database having the inventories of the compounds stored thereby. The central remote managing unit is configured for receiving the data from the local managing modules through at least one communication link.

The system optionally uses cloud technology for the data processing and communication between the local managing units and the central managing unit and at least one database thereof.

Additionally or alternatively, the RFID tags and reader units of each local inventory system are configured for using ultra-high frequency (UHF) of RFID communication of between 860-960 MHz with low RF radiation intensity using passive RFID tags.

The system optionally further comprises at least one gateway server for relaying communication between at least one of the main managing units and the at least one remote cloud server.

According to yet other aspects of the present invention, there is provided a method for managing inventories of multiple compounds, each compound associated with an entity, comprising: (a) receiving updated data from multiple local management modules each local management module being configured for receiving updates of RFID tags of multiple RFID tagged articles from reader units in multiple storage units of the compound; (b) updating at least one inventories related database; and (c) managing inventories of all registered compounds by updating inventory in the database.

The method optionally further comprises: (d) identifying evens including at least supply shortage or surplus and articles misplacement events; and (e) operating at least one operation responsive to the identification of an event. For example, the operations operated upon event identification include: (i) sending an alert message to at least one destination for indicating the event; and/or (ii) automatic ordering of articles identified as being in shortage in the compound.

BRIEF DESCRIPTION OF THE DRAWINGS

FIGS. 6A-6B show how a reader unit having hardware reader module is configured for receiving RFID tags data from multiple RF antennas thereof and transmit this data to the local management unit through several communication technologies using different communication protocols, according to some embodiments of the invention.

DETAILED DESCRIPTION OF SOME EMBODIMENTS OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention, in some embodiments thereof, provides systems and methods for managing one or more inventories of articles tagged by radio frequency identification (RFID) tags in respective one or more compounds of entities such as shops, hospitals, clinics, pharmacies, in which the tagged articles are either simply stored such as in storage compounds, used such as in hospitals and the like or soled such as in pharmacies or shops.

The term "article" herein refers to any item that can be kept in storage and requires inventory identification such as products (organic and non-organic), pharmaceuticals, medical and sanitation equipment for hospitals and clinics for instance, grocery products, and the like.

In some embodiments, in each compound, the tagged articles are distributed in a plurality of storage units such as cabinets or refrigerators, having multiple drawers and/or shelves located in the predefined compound.

The present invention, inter alia, provides kits for retrofitting existing storage units of the compound to add-on the RFID based inventory management thereto. In some embodiments of the invention, ach kit comprises a plurality of reader units each located inside or in proximity to one of the storage units of the compound. Each of the reader units has or is operatively associated with one or more RF antennas for receiving signals data from the RFID tags of articles in the storage unit it is located in or in proximity to or tagged articles located in an area (a shelf or drawer) of the storage unit; and a communication unit configured for transmitting and receiving the received RFID tags data through at least one reader communication link.

The RFID tags are configured, as known in the art, to wirelessly transmit RF signals of a predefined RF frequency or frequency range indicative at least of the identity of the tag. In some embodiments the RFID tags used are passive tags, i.e. RFID tags requiring transmission of a RF signal that will provide the tags the energy required for them to transmit their ID signal in response.

According to some embodiments of the invention the reader units' antennas and RFID tags of the articles are configured for using ultra-high frequency (UHF) for RF communication e.g. ranging between 860-960 MHz.

According to some embodiments, the system installed in each compound includes a local management module adapted to receive data from all the reader units in the compound for centralizing management of the inventory of the compound. The local management module is operable through a remote computer medium located in the compound remotely from the reader units of the compound to allow collecting (by receiving) incoming data from all reader units of the compound. The collected data is then used for inventory management such as for updating a remote and/or local database for enabling listing existing articles inside the storage units. This information can then be used for any inventory management activities such as for ordering of depleting articles, for preventing ordering of articles that are in excess in the inventory, for identification of expiring products for removal thereof from the storage units, for transferring articles from one storage unit to another for optimal distribution thereof and the like.

Some of the calculations for the inventory management (such as expiring products identification, distribution status and optimization, ordering of articles and the like) can be automatically done by a designated inventory managing application of the local management module or in a remote management unit managing multiple compounds inventories. In other embodiments the database simply indicates the identity of the articles currently existing in the storage units.

According to some embodiments the system is configured such as to read the tags of the articles in a frequent manner e.g. every few seconds or minutes (depending on the requirements dependent of articles type and entity type by transmitting an activation signal to the RFID tags through the RF antennas of the reader units and reading the articles in the storage units thereby. The reader units will transmit data indicative of their antennas readings to the local management module for updating the database of the compound or area thereof.

In some embodiments, the reading frequency meaning the time interval between one reading of each reader unit to another reading may be set by an authorized user of the system through a designated user interface of the local management module. The reading frequency may not necessarily be identical for all reader units of the system. The reading frequency of each reader unit may be adapted according to the requirements of the system operator, which may depend on the articles type in the storage unit, how frequently this storage unit is used in the compound etc.

The communication between the reader units and the local management module may be wireless and/or through cabled communication. The management module may be adapted to communicate with the reader units through more than one communication technology whereas the reader units of the same compound may use different types of transmission means and technologies. Some exemplary communication technologies that can be used for the reader units to communicate with the local management module are as follow: Bluetooth, WiFi, NFC, RS-232/485 Cable communication, ZigBee, UHF RF, and the like using any one or more known in the art communication protocols.

According to some embodiments, the RF antennas are multidirectional or omnidirectional not arranged in a phase array configuration and avoiding reading of nearby tagged articles that are external to the storage unit thereof by using weak signal intensity.

In other embodiments, directional RF antennas can be directed to the storage unit area thereof using higher signal intensities such as circular antennas or multi/omnidirectional antennas arranged in a phase array configuration for amplifying signals arriving from the storage unit area.

According to some embodiments, each reader unit may be operatively associated with one or more external RF antennas and/or with one or more on-board (on-chip) RF antennas embedded therein. Each reader unit comprises a digital/electronic board optionally having one or more micro RF antennas embedded therein and/or one or more external RF antennas connected thereto. The reader unit board, in some embodiments, has a communication unit having RF based transceiver such as UHF RF transceiver for receiving signals from the articles RFID tags and optionally also for activating the articles RFID tags.

In some embodiments, the articles identification also helps identifying transfer and dislocation of articles for assisting in locating required articles in the entire inventory.

According to some embodiments of the present invention, there is provided a centralizing system for enabling remote management of many inventories located in multiple storage units optionally associated with different entities by receiving and managing data from multiple local management modules of the various entities and their one or more compounds. The remote data storage, communication and data processing of the central remote management unit can be implemented by using cloud data management, storage and communication technology.

The communication between the remote management unit and the local management modules can be carried out using one or more long-distance communication networks and technologies such as through one or more of: internet communication, cellular communication and the like, using one or more communication protocols.

Figure 1:
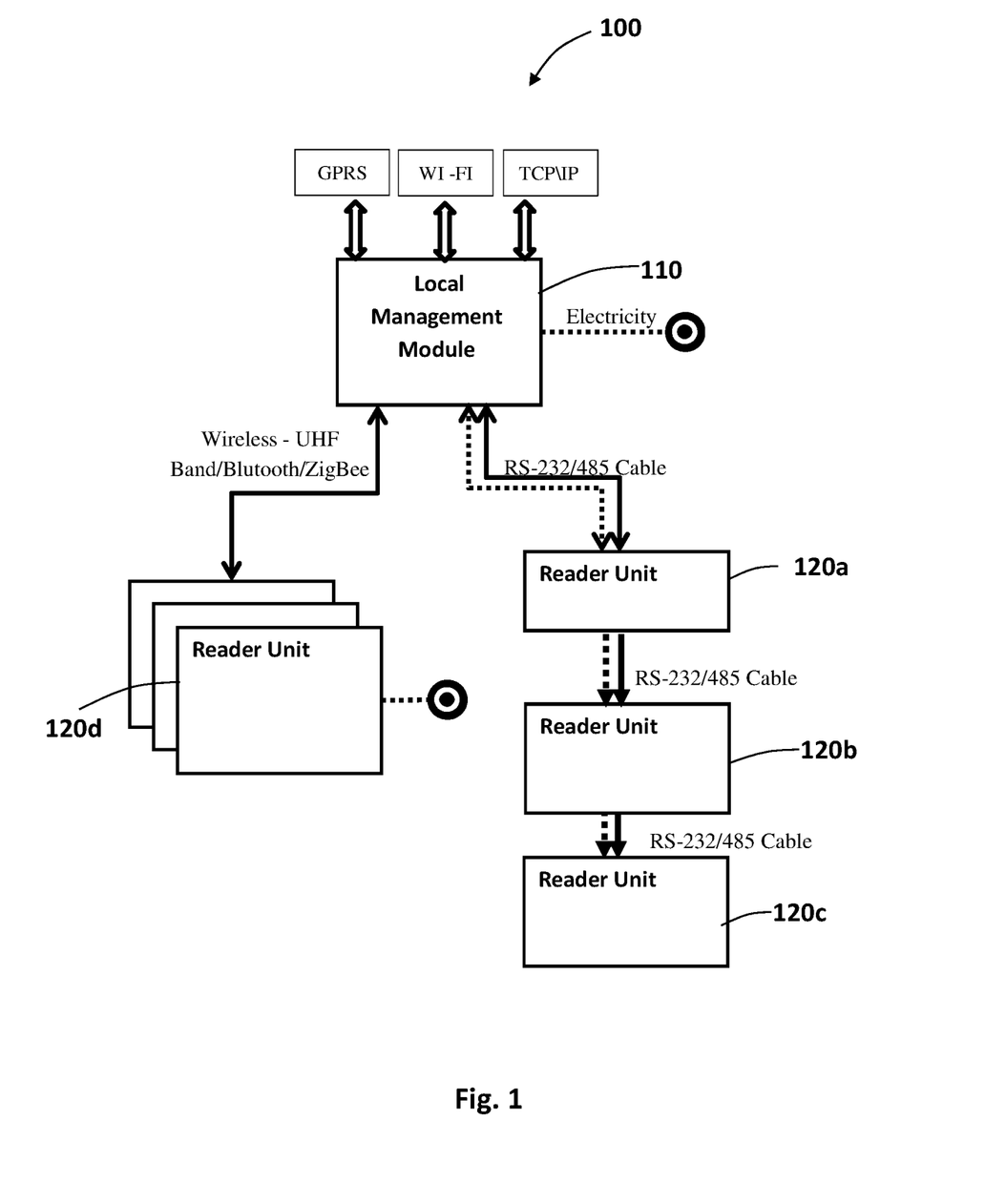
FIG. 1 is a block diagram illustrating a system for managing one or more inventories of RFID tagged articles in a single compound, according to some embodiments of the invention.

Reference is now made to FIG. 1, which is a block diagram illustrating a system 100 for managing one or more inventories of radio frequency identification (RFID) tagged articles in a single compound such as a pharmacy, a hospital, a hotel, a shop, a warehouse and the like, according to some embodiments of the invention. The RFID tagged articles are stored in storage units of one or more types such as closets, cabinets, shelves or shelves units, containers and the like. In each storage unit there is installed (e.g. fastened, attached or placed) a reader unit such as one of reader units 120a-120d. The system also includes a local management module 110 for receiving data from all the reader units 120a-120d of the compound and processing, storing and optionally also transmitting the data or data indicative thereof to a remote central management unit for further processing and storage.

The reader units 120a-120d may be of the same or different types using the same or different RF antennas and RFID reading technology and optionally enabling transmitting data indicative of the received signals from the RFID antennas thereof through the same or different communication links and protocols. For instance, as shown in FIG. 1, the reader units of 120a, 120b and 120c are configured to transmit data via communication cables such as RS-232/485 cables whereas reader units 120b and 120c transmit data indicative of readings of their RFID antennas to the reader unit 120a which serves as a relay unit as well as a reader unit. Reader unit 120a then transmits data indicative of antennas readings of all reader units 120a-120c to the local management module 110 operable through a computer remotely located therefrom, where reader unit 120a also transmits data to the local management module 110 through communication cabling. Reader unit(s) 120d, however wirelessly communicates with the local management module 110.

According to some embodiments, the local management unit 110 is operable through a computer processor and memory and configured for receiving data from all the reader units 120a-120d of the compound, storing and processing of the received data and optionally also of presenting thereof. For example, the received data may be translated at the local management unit to an inventory listing indicating the location of each tagged article that was indicated in the data transmitted thereto. The local management unit 110 may also use one or more algorithms for identifying inventory events such as shortage and surplus in articles supply, misallocation or misplacement of articles in the compound and the like and operate one or more predefined operations upon event identification such as transmitting messages to communication devices of authorized persons e.g. through one or more messaging technologies such as through emails. Short messaging services (SMS) and the like. Optionally, the local management module 110 is also adapted to operate operations such as automatic ordering of supply upon identification of a shortage event and the like.

In other embodiments, the local management module 110 is only configured for transmitting updated inventory data of the compound to a central remote management unit configured for managing inventories of multiple compounds, through one or more communication links using one or more communication protocols such as the internet (using TCP/IP), WiFi, mobile/cellular (GPRS) and the like.

According to some embodiments, the management module 110 is also configured for at least one of: compression of the data and/or encryption of the data for transmission thereof to the remote management unit. These, correspondently require decompression and decryption of the data at the remote central management unit, respectively.

Figure 2:
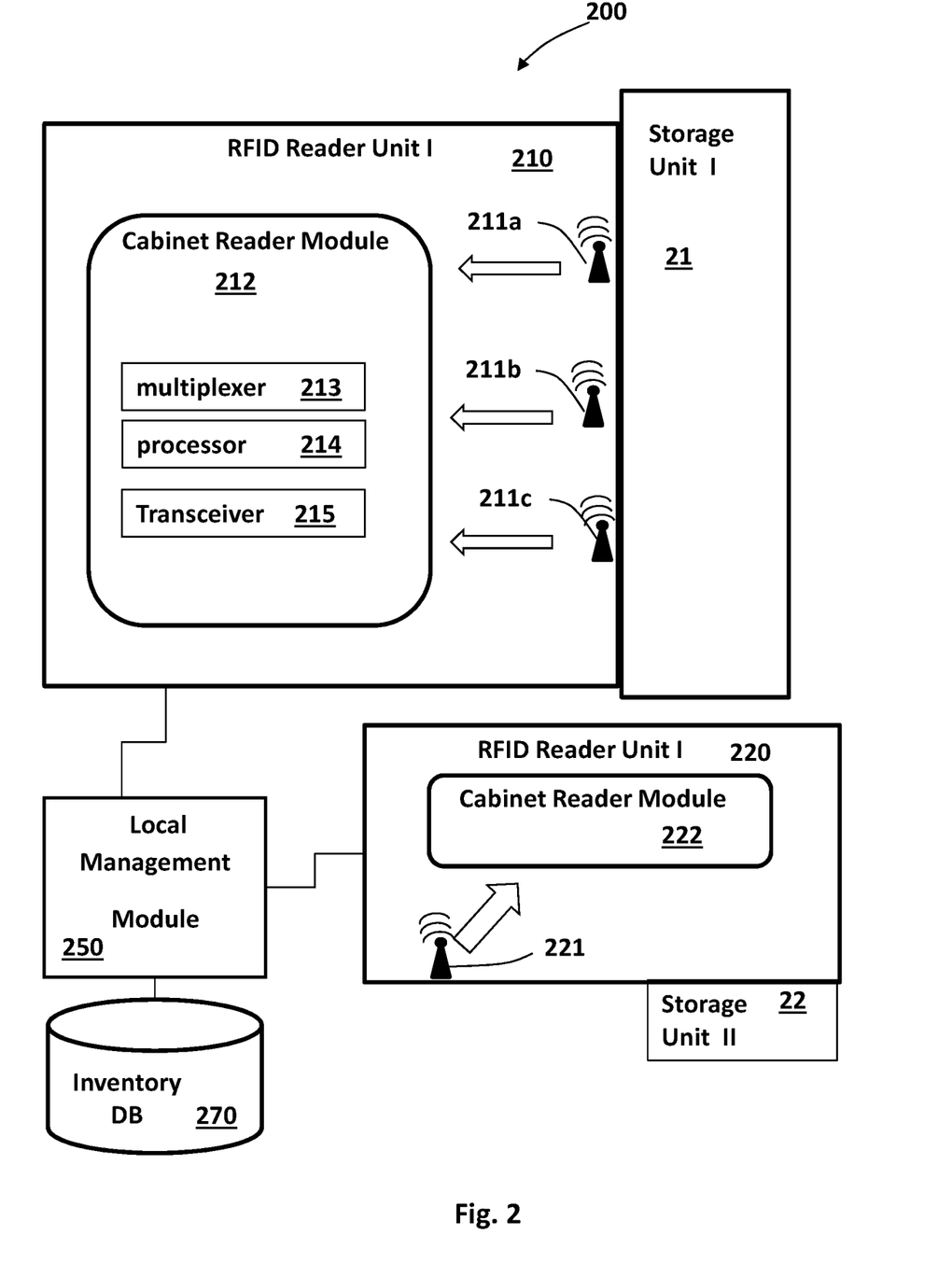
FIG. 2 is a block diagram illustrating how reader units of the system communicate with a local management module of the system, according to some embodiments of the invention.

Reference is now made to FIG. 2, which is a block diagram illustrating a system 200 for inventory management having reader units 210 and 220 each installed in a different storage unit 21 and 22, respectively, and a local management module 250, according to some embodiments of the invention. Each reader unit such as reader unit 210 or 220 is a PCB having a reader module 212 or 222 and is connected to or has printed thereover one or more RFID antennas such as antennas 211a, 211b and 211c or 221. The reader module 212 or 222 may include a multiplexer 213, a processor 214 such as a microprocessor and a transceiver 215 for communicating with the local management module 250.

The local management module 250 may have access to a local or a remote database such as local database 270 in the same computer over which the module 250 is operable for keeping the inventory data of the compound therein.

The inventory data in the database 270 may have a data structure that is organized according to the storage units forming "virtual storage units" for management thereof, i.e. each article identifier in the database 270 is associated with a single storage unit 21 or 22. The updates of data arriving to the management module 250 from the reader units 210 and 220 indicates the identity of RFID tagged articles therein, this data is then updated in the database 270 and the local management module 250 or a remote management unit then checks for events in the inventory of the compound such as articles shortage or surplus or misplacement of articles and the like using one or more algorithms using events conditions and rules.

In some embodiments the local/remote management module/unit is configured for simple presentation of updates status of the inventory e.g. by presenting lists of the articles identified in the storage units according to articles type groups.

According to some embodiments, the local management module 250 is a software application ran by the computer in which it is installed, located in the compound. The application may support a presentation module including for instance a user interface (UI) allowing a user to set conditions for identifying an even supply shortage of displacement for example, sending alert messages indicative of the identified events and the like.

According to some embodiments of the invention the reader units of the system receive updated readings from the antennas of the reader units thereof within predefined time intervals (transmission frequency) or upon transmitting a reading request from the management module operating at least some of the reader units of the compounds to provide (transmit) updated readings). In some cased for some compounds, depending on requirements of the compound owner/manager, some areas in the compound may require more frequent readings than other areas and therefore the system may be adapted to have each reader unit read and update the local management module at a different reading frequency.

According to some embodiments, the local management module is adapted to be able to set the transmission frequency for each reader unit separately or for groups of reader units of each zone in the compound separately according to system requirements. The local management module may also be configured for learning the compound areas or storage units for automatically adjusting the transmission frequencies of the reader units according to the behavior thereof. For example, in some storage unit the updates may indicate that the inventory in the particular area of storage units of the compound or of the particular storage unit does not change that often and therefor reset the transmission frequency of the reader unit(s) thereof to a larger time interval between readings etc.

Figure 3:
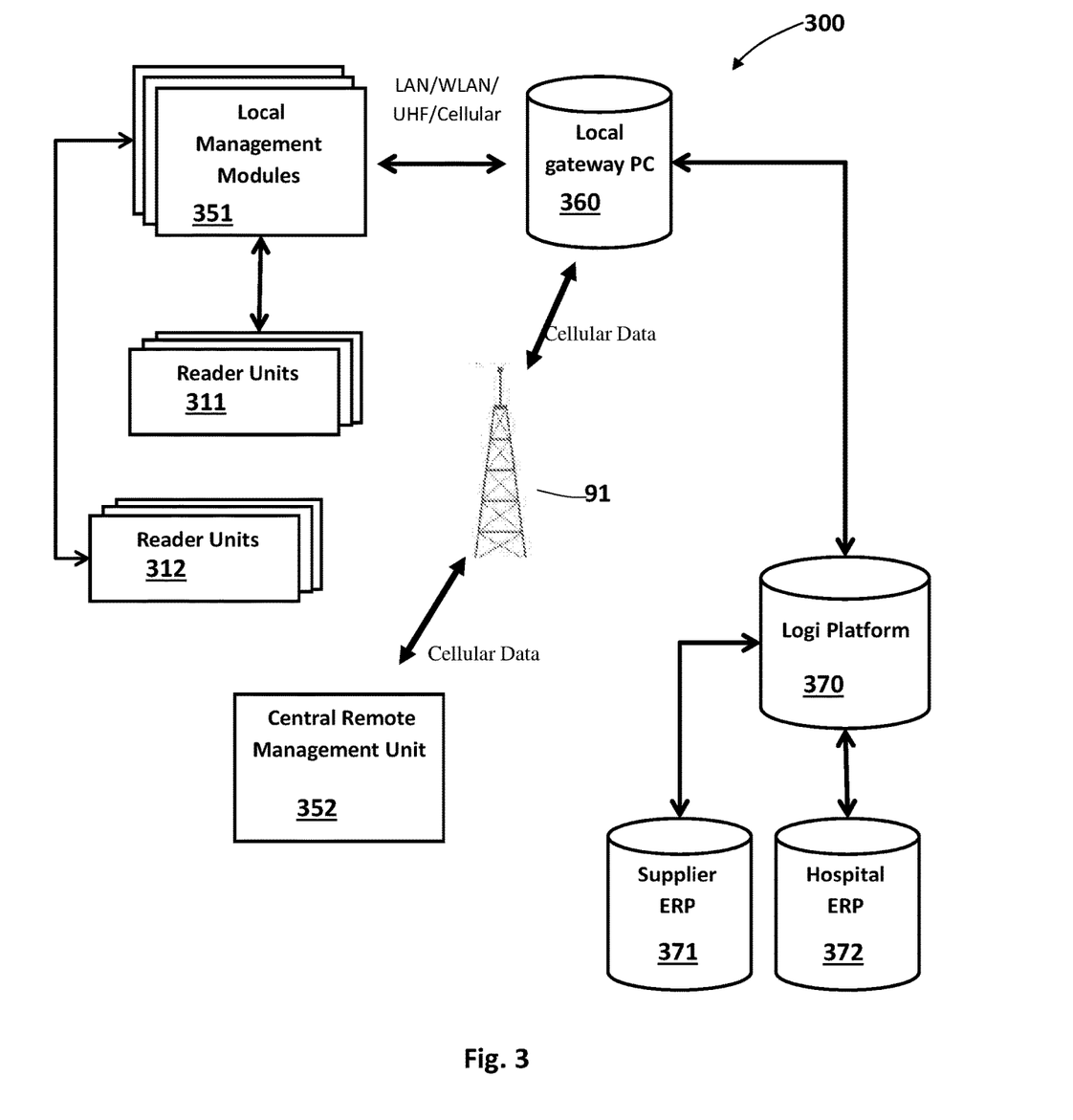
FIG. 3 is a block diagram illustrating a system for managing multiple inventories of RFID tagged articles for multiple compounds optionally associated with multiple entities, wherein the system uses cloud technology for management, storage and processing of inventories related data, according to some embodiments of the invention.

Reference is now made to FIG. 3, which is a block diagram illustrating a system 300 for managing multiple inventories of RFID tagged articles for multiple compounds optionally associated with multiple entities such as multiple companies and/or service providers, wherein the system 300 uses cloud technology for management, storage and processing of inventories related data, according to some embodiments of the invention.

The system 300 in this case includes a central remote management unit 352 remotely located from at least some of the compounds for which it manages inventories, for remotely and centrally manage all inventories of all compounds registered in its records. The system 300 is set to communicate with multiple local management modules 351 through one or more communication links such as through internet links or through cellular network communication 91. In this way each local management module 351 of each compound receives updated data in real time or near real time or every predefined time interval from its associated reader units and transmits the received data in real time, near real time or at a predefined scheduled frequency to the central remote management unit 352 for having the inventory thereof managed remotely from the compound.

The data from the multiple local management modules 351 may be transmitted to the central remote management unit 352 passing through several communication links for cloud server operation of the remote management unit 352 for remotely saving the inventory related data of the compounds' inventories at cloud server(s) storages such as 370, 371 and 372 optionally through one or more local gateways such as gateway 360.

Figure 4:
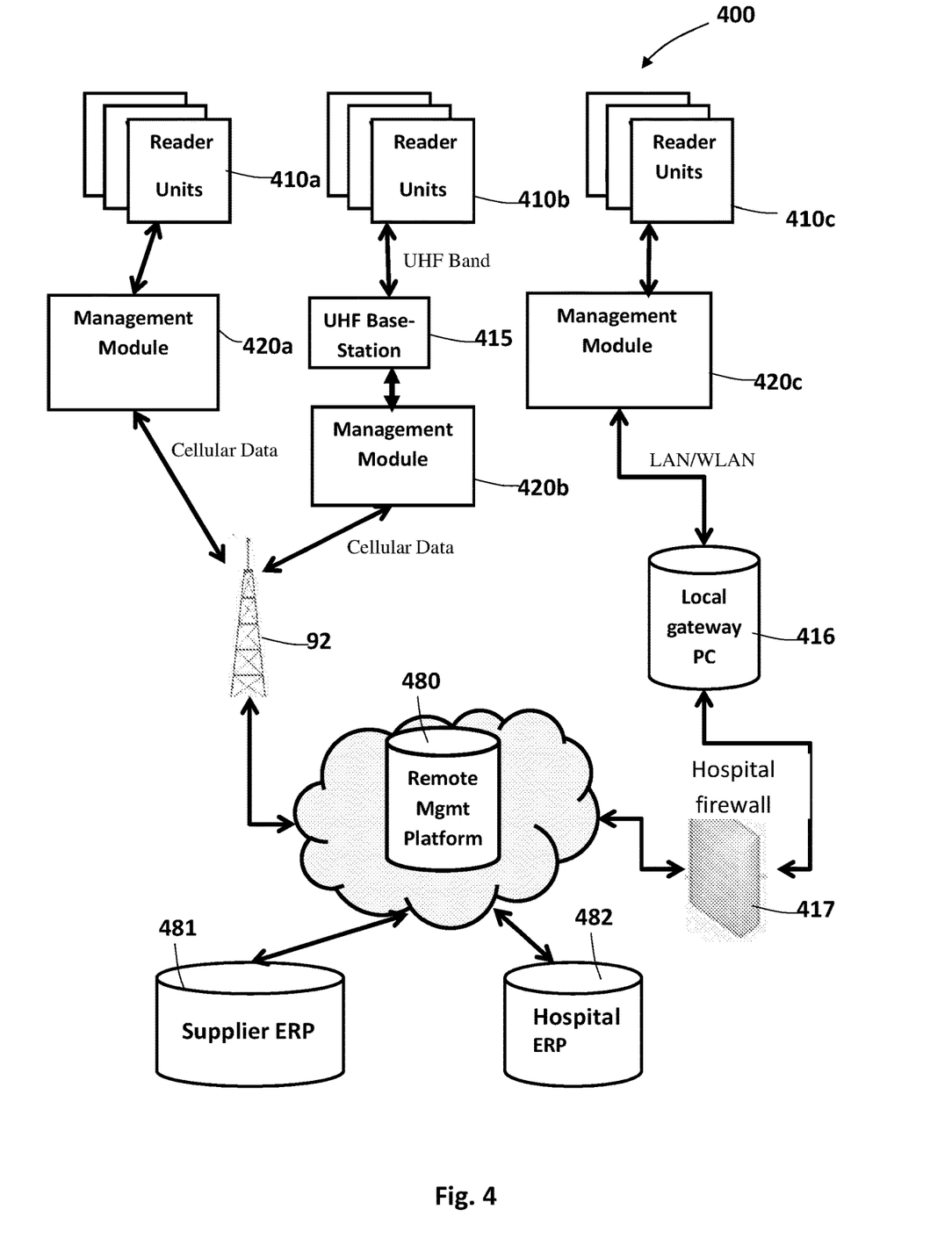
FIG. 4 is a block diagram illustrating a system for managing multiple inventories of RFID tagged articles for multiple compounds optionally associated with multiple entities optionally associated with multiple entities using enterprise resource planning (ERP) for improved inventory and consignment stock management, according to some embodiments of the invention.

Reference is now made to FIG. 4, which is a block diagram illustrating a system 400 for managing multiple inventories of RFID tagged articles for multiple compounds optionally associated with multiple entities at least one of which requiring enterprise resource planning (ERP) for improved inventory and consignment stock management, according to some embodiments of the invention. FIG. 4 illustrates a system 400 that manages inventories for three entities and compounds each associates with a different system of reader units. For example a first compound is a hospital with an inventory of RFID tagged disposable articles such as drugs, disposable medical equipment, disposable utility articles such as towels, tissues, cotton, pads and the like arranged in storage units over which reader units 410a are mounted for retrofitting of the storage units for enabling RFID tags reading and data transmission therefrom to a local management module 420a of the hospital. Other entities and other compounds thereof may be registered in the system 400 for inventory management thereof each having multiple reader units optionally associated with multiple entities at least one of which requiring enterprise resource planning (ERP) for improved inventory and consignment stock management 410b and 410c installed in their storage units for reading RFID tagged articles therein. Each compound also has one or more local management modules 420b and 420c thereof for centralizing data from all the reader units and transmitting the data to a central remote management unit 480 of the system 400 and database(s) thereof for managing each inventory of each compound of each registered entity through ERP modules such as modules 481 and 482.

In this way, the database may have virtual storage units for each compound managed remotely by the remote management unit 480.

According to some embodiments, as shown in FIG. 4, communication between the local management modules 420a-420c (operable via local servers) may be carried out through one or more communication networks using one or more communication technologies and data protocols such as through cellular network 92. For one or more of the entities local gateway servers may be used such as gateway 416 for using security means 417 for protecting data transferred.

As illustrated in FIG. 4, in some compounds relaying technologies may be used such as a UHF relay station 415 for having the data from the reader units 410b transferred through a short range communication link thereto and then therefrom through another communication link to the local management module 420b.

Figure 5:
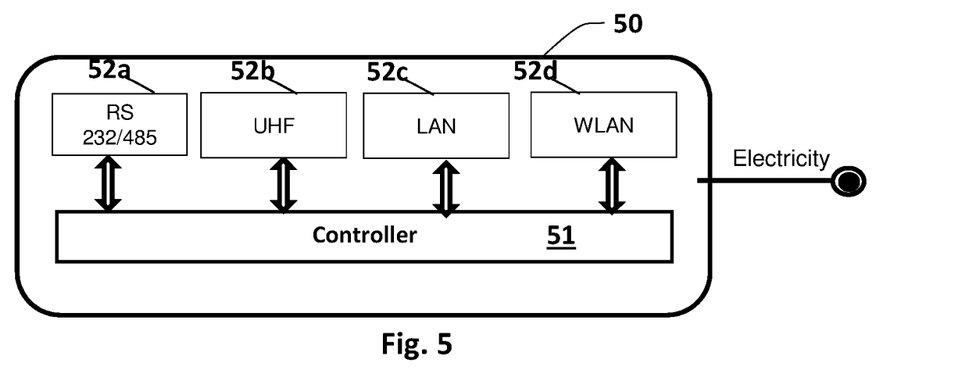
FIG. 5 shows a local management module using multiple communication technologies for communication with a remote management unit centralizing inventories data for multiple compounds, according to some embodiments of the invention.

Reference is now made to FIG. 5, which shows a local management module 50 using multiple communication technologies for communication with a remote management unit, by using for example, a controller 51 adapted to transmit and receive data via communication data cable RS 232/485, via UHF RFID communication, local area network (LAN) and/or wireless LAN (WLAN).

Figure 6A:
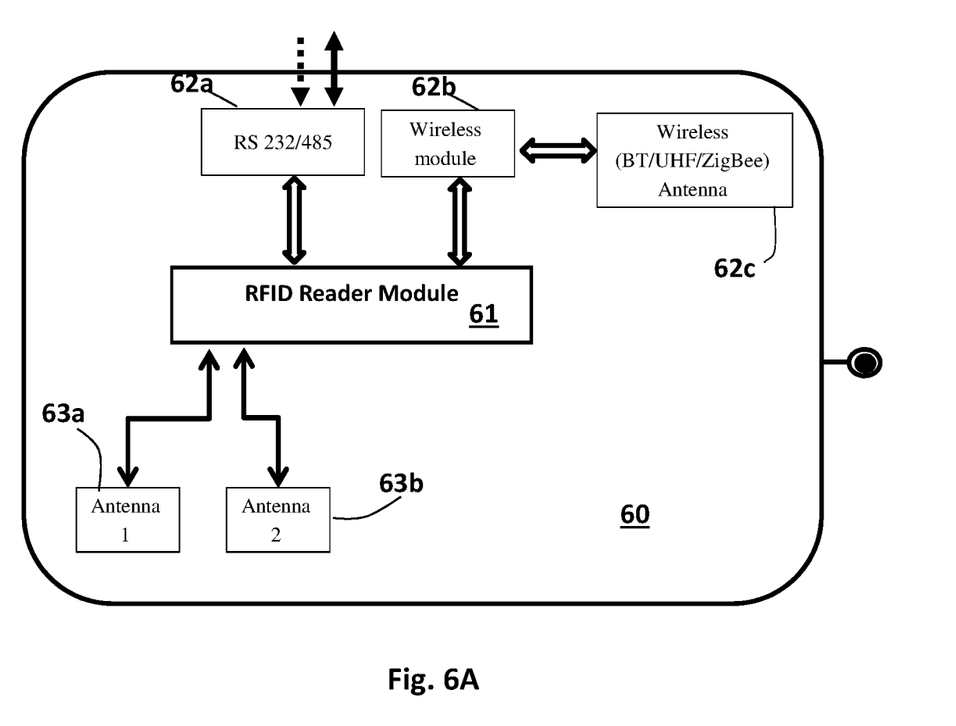
FIG. 6A shows a reader unit that has two RF antennas.
Figure 6B:
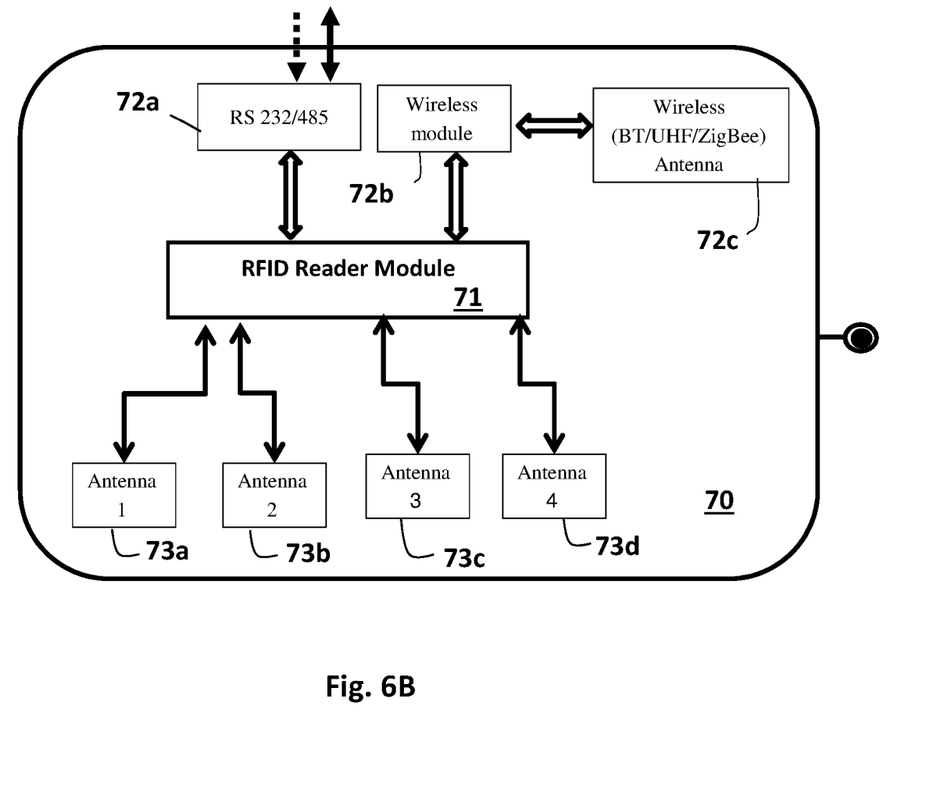
FIG. 6B shows a reader unit that has four RF antennas.

FIGS. 6A-6B show how a reader unit having hardware reader module is configured for receiving RFID tags data from multiple RF antennas thereof and transmit this data to the local management module through several communication technologies using different communication protocols, according to some embodiments of the invention: FIG. 6A shows a reader unit 60 that has two RF antennas 63a and 63b using a reader module 61 such as a printed circuit board (PCB) for receiving antennas signals and transmitting data indicative thereof through one or more communication links 62a-62c. FIG. 6B shows a reader unit 70 that has two RF antennas 73a-73d using a reader module 71 for receiving antennas signals and transmitting data indicative thereof through one or more communication links 72a-72c.

Figure 7:
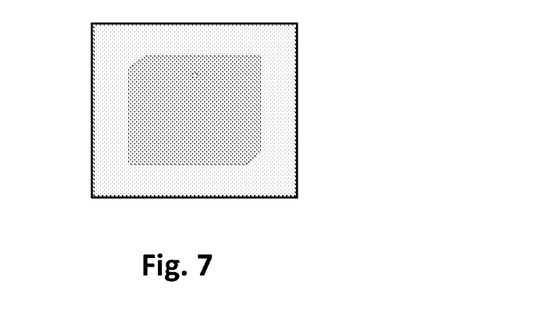
FIG. 7 shows a 915 MHz RFID ceramic antenna, according to some embodiments of the invention.

In some embodiments, at least some of the reader units are printed circuit boards (PCBs) having on-board RFID antennas such as 915 MHz RFID ceramic antennas such as shown in FIG. 7, such as ROGERS RO3010 PCB with thickness of 3.2 mm; ROHS compliance, Size 73×75 mm.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations.

The excision of any disclosed element of the invention is explicitly contemplated as within the scope of the invention.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The invention claimed is:

1. A computerized system for managing an inventory of articles tagged by radio frequency identification (RFID) tags, said tagged articles being distributed in a plurality of storage units located in a predefined compound, said system comprising:
   a) a plurality of RFID reader units, provided as a retrofitting kit, each RFID reader unit installed inside or in proximity to a respective storage unit of the compound, wherein each of said RFID reader units comprises at least one RF antenna, for receiving direct RFID tag data from RFID tags of articles in said respective storage unit, using circular polarization, and a communications unit configured for receiving additional RFID tag data from a linked RFID reader unit, and for transmitting both the received direct RFID tag data and the additional RFID tag data through RS232/485 cable and wireless communication links; and
   b) a local management module adapted to receive RFID tag data from at least on of RS232/485 cable and wireless communication link and responsively update an inventory database of the compound, wherein at least a first RFID reader unit of the plurality of RFID reader units transmits both its direct and additional RFID tag data to the local management unit, and wherein the first RFID reader unit receives its additional RFID tan data by an RS232/485 cable from a second RFID reader unit of the plurality of RFID reader units.

2. The system according to claim 1, wherein the RF antenna receives the direct RFID tag data over an ultra-high frequency (UHF) band within the range of 860-960 MHz.

3. The system according to claim 1, wherein each of said RFID reader units has a casing configured to attach the given RFID reader unit to or mount the given RFID reader unit over its respective storage unit.

4. The system according to claim 1, wherein said RFID tags are passive tags and said RF antennas are configured for corresponding RF operation of the passive RFID tags.

5. The system according to claim 1, wherein said RF antennas of said RFID reader units are multi-directional or omnidirectional.

6. The system according to claim 5, wherein the RF antennas of each RFID reader unit are arranged in a phase array configuration for firming directionality towards the storage unit interior area.

7. The system according to claim 5, wherein the RF antennas of each RFID reader unit are arranged with no phase differences.

8. The system according to claim 1, wherein the wireless communication links are at least one of: WiFi, Bluetooth, ZigBee, and RF UHF.

9. The system according to claim 1, wherein each RFID reader unit is set to transmit data to the local management module according to an interval frequency, which is pre-defined and optionally adjustable.

10. The system according to claim 9, wherein said local management module is configured for adjusting the interval frequency of each of said RFID reader units of the system according to a type of articles in the respective storage unit and how frequently the respective storage unit is used.

11. The system according to claim 1, wherein said tagged articles are consumable articles.

* * * * *